UNITED STATES PATENT OFFICE.

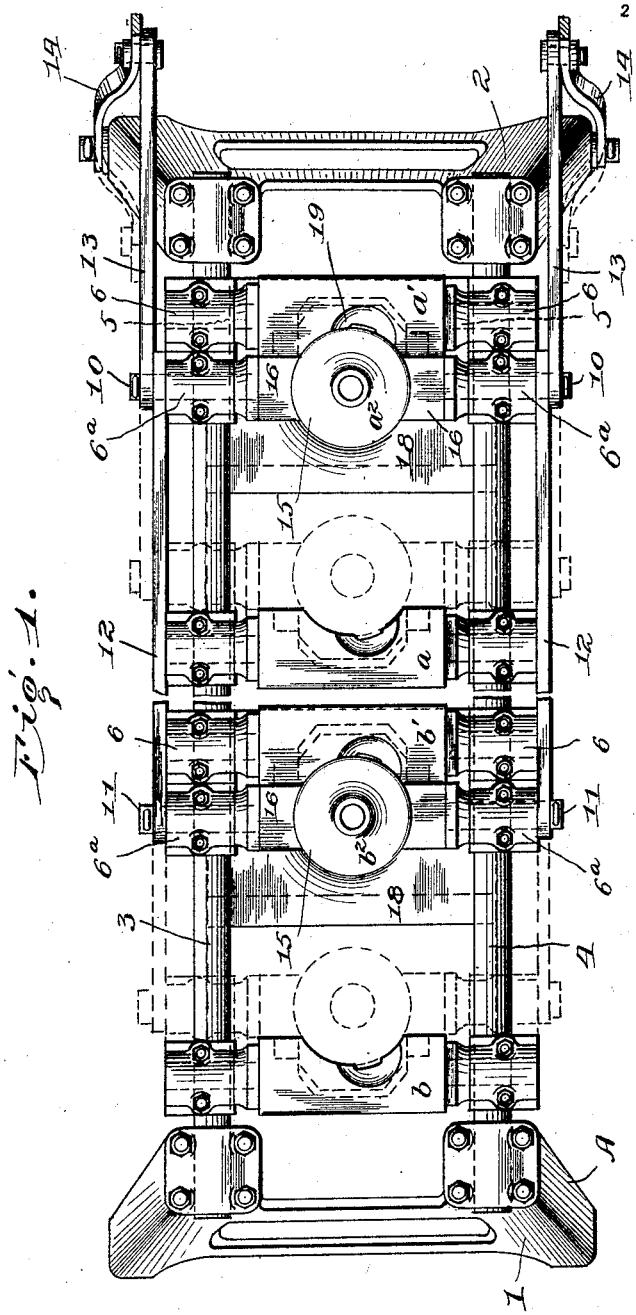

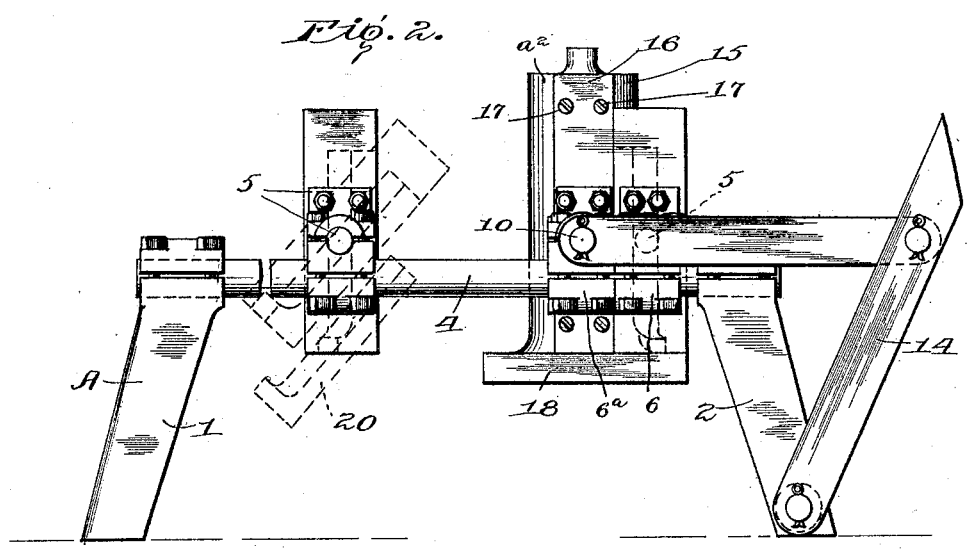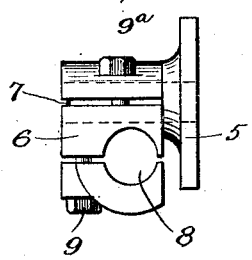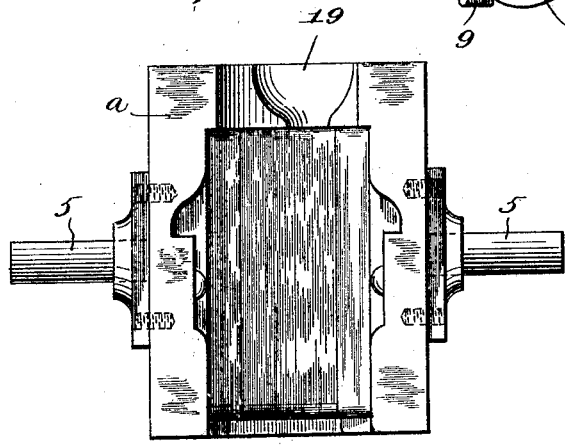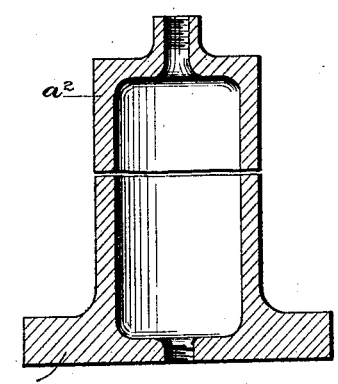

JAMES V. MARTIN, OF BALTIMORE, MARYLAND, ASSIGNOR TO HARRY D. HARVEY, OF BALTIMORE, MARYLAND.

MOLDING APPARATUS.

1,411,739.  Specification of Letters Patent.  Patented Apr. 4, 1922.

Application filed October 19, 1920. Serial No. 418,009.

*To all whom it may concern:*

Be it known that I, JAMES V. MARTIN, a citizen of the United States, residing at Baltimore, in the State of Maryland, have invented certain new and useful Improvements in Molding Apparatus, of which the following is a specification.

This invention relates to improvements in molding apparatus for molding metal articles, particularly car journal bearings. The purpose of the invention is to lessen the labor and cost of casting such articles. In carrying out my invention, I arrange a pair of half molds at a fixed distance apart, and between these half molds is arranged a sliding mold part which is complementary of both of the half molds and movable into engagement with either by means of a lever and suitable connections. A pair of half molds and a complementary mold part, mounted upon suitable supporting bars, constitute one molding unit, of which there may be several supported on the same bars and operated by the same lever. By this arrangement, the complementary mold part of each unit may be moved into operative engagement with one of the half molds of the unit, by one throw of the lever, and after the metal has been poured in one set of the complete molds thus formed, the complementary mold parts may be moved into operative engagement with the other half molds of the several units, and another set of castings may be poured while the first castings poured are being removed from the half molds. The several mold parts are suitably cored for the circulation of water, or air, to quickly chill the castings, and to expedite the removal of the castings from the half molds, the latter are pivoted on their supports so that they may be readily turned face downward to allow the castings to drop out when the half molds are tapped. With the apparatus of this invention, the castings can be made with great economy in labor, only two men being required for a considerable number of molds, one to pour the metal, and the other to shift the complementary mold parts at the proper times and to dump the castings out of the half molds.

In the accompanying drawing,

Fig. 1 is a top plan view of a molding apparatus made according to my invention, and embodying two molding units, the supporting bars and side links being broken away at the center;

Fig. 2 is a side elevation of one molding unit;

Fig. 3 is a detail view of one of the bearings for the several mold parts;

Fig. 4 is a face view of one of the half molds; and,

Fig. 5 is a longitudinal, central section through one of the sliding mold parts.

Referring to the drawing, A indicates a frame comprising end supports 1 and 2, which are connected together by a pair of guide rods 3 and 4. These rods support the molds and they vary in length according to the number of molds which they carry. Two pairs of half molds $a$, $a'$ and $b$, $b'$ are shown in Fig. 1, secured to the guide bars, the half molds of each pair being spaced the same distance apart. Between the half molds $a$, $a'$ is arranged a complementary mold part $a^2$, which is slidably mounted upon the guide rods and movable into engagement with either of the half molds of the pair, and between the half molds $b$, $b'$, is arranged a similarly mounted mold part $b^2$, which is movable into engagement with either of the half molds $b$ or $b'$.

In Fig. 4 is shown a face view of one of the half molds suitable for forming journal bearings. Each half mold is provided with trunnions 5, projecting from its opposite sides, and these trunnions extend into fittings 6, which are clamped to the guide bars. As shown in Fig. 3, each fitting has a split bearing 7 for the trunnion and a similar bearing 8 for the guide rod, the latter being at right angles to the bearing 7. By means of clamping screws 9, the bearing 8 may be tightened upon the guide rod to secure the fitting thereto. The bearing 7 is also provided with screws $9^a$, for adjusting the cap of the bearing, but this bearing is not clamped against the trunnion of the half mold, the latter being free to turn. The movable mold parts $a^2$ and $b^2$ are provided at their opposite sides with trunnions 10 and 11, respectively, and these trunnions engage fittings $6^a$, which are in all respects the same as the fittings 6, but these fittings are not clamped tightly to the guide rods and the mold parts may be moved along the rods. The trunnions 10 and 11 of the different units are connected together by links 12, and the trunions 10, at one end of the frame, are connected by links 13 to a lever 14. By operating the lever, the mold parts $a^2$, $b^2$ may be moved from their full line positions, where they engage the half molds $a'$, $b'$, to the dotted line positions where they will engage the half molds $a$ and $b$.

Each movable mold part has a cylindrical portion 15 and flat side pieces 16, the latter pieces secured to the cylindrical portion by screws 17, and the trunnions projects from said side pieces. The cylindrical portion and the side pieces are adapted to fit closely against the faces of the half molds, and a flange or foot 18, on the lower part of the movable mold part, which projects in opposite directions from the faces of said part, is adapted to fit under the half molds and close the lower ends of the latter.

In operation, the movable mold parts are moved, by the lever, into engagement with one set of half molds, as shown in full lines in Fig. 1, and the metal is poured into the molds through openings 19 in the tops of the half molds. The molds are suitably cored and cooled by water or air flowing through connections, (not shown) and as soon as the metal is set in one set of half molds, the movable parts may be moved into engagement with the other set of half molds and another set of castings may be poured therein. While this latter set of castings is being poured, the half molds in which the first set was poured may be tilted, and the castings 20 will drop out, as indicated by the dotted lines in Fig. 2.

While I have shown only two molding units in Fig. 1, it will be obvious that as many units may be added as can be conveniently operated by the lever.

What I claim is:

1. In a molding machine, two half molds spaced apart from one another, a mold part, complementary of each of said half molds, slidably mounted between said half molds, and means for moving said mold part into engagement with either of said half molds.

2. In a metal molding machine, a pair of parallel guides, two half molds pivotally mounted thereon and spaced apart from one another, and a mold part, complementary of each of said half molds, arranged between said half molds and slidable on said guides into engagement with either of the same.

3. In a metal molding machine, a pair of parallel guides, two half molds pivotally mounted thereon and spaced apart from one another, a mold part, complementary of each of said half molds, arranged between said half molds and slidable on said guides into engagement with either of the same, a yoke pivoted to said mold part, and a lever connected to said yoke for moving said mold part.

4. In a machine for molding metal bearings, a pair of parallel guides, two half molds secured thereto and spaced apart from one another, a mold part, complementary of each of said half molds, slidable upon said guides into engagement with either half mold, said mold part having an upright cylindrical portion, and a foot, the latter adapted to fit under the half molds.

In testimony whereof I affix my signature.

JAMES V. MARTIN.